United States Patent

[11] 3,627,807

| [72] | Inventors | Otto Bleh<br>Bergheim Nachtigallenweg;<br>Walter Rogler, Ranzel Gierslingerstr. 6;<br>Wilhelm Joch, Niederkassel Gartenweg 4,<br>all of Germany |
|---|---|---|
| [21] | Appl. No. | 851,108 |
| [22] | Filed | Aug. 18, 1969 |
| [45] | Patented | Dec. 14, 1971 |
| [32] | Priority | Aug. 17, 1968 |
| [33] | | Germany |
| [31] | | P 17 93 222.8 |

[54] METHOD OF PREPARING ORTHOSILICIC ACID TETRAALKYL ESTERS
13 Claims, 1 Drawing Fig.

[52] U.S. Cl. .................................................. 260/448.8 A,
260/448.8 R
[51] Int. Cl. ............................................... C07f 7/18
[50] Field of Search ........................................ 260/448.8 A

[56] References Cited
UNITED STATES PATENTS

| 2,909,550 | 10/1959 | Sperr ........................... | 260/448.8 A |
| 2,927,937 | 3/1960 | Gaines .......................... | 260/448.8 A |
| 3,232,972 | 2/1966 | Beanland ....................... | 260/448.8 A |

*Primary Examiner*—Jobias E. Levow
*Assistant Examiner*—P. F. Shaver
*Attorney*—Burgess, Dinklage & Sprung

ABSTRACT: Process for the preparation of orthosilicic acid tetraalkyl esters by the reaction of at least one of silicon, iron silicide and ferrosilicon with the corresponding alcohol in the presence of the corresponding alkali alcoholate which comprises carrying out the reaction in the presence of 70 to 99 percent by weight referred to the total amount of liquid present and preferably in the presence of 80 to 90 percent by weight of the orthosilicic acid tetraalkyl ester and continuously introducing the alcohol during the reaction.

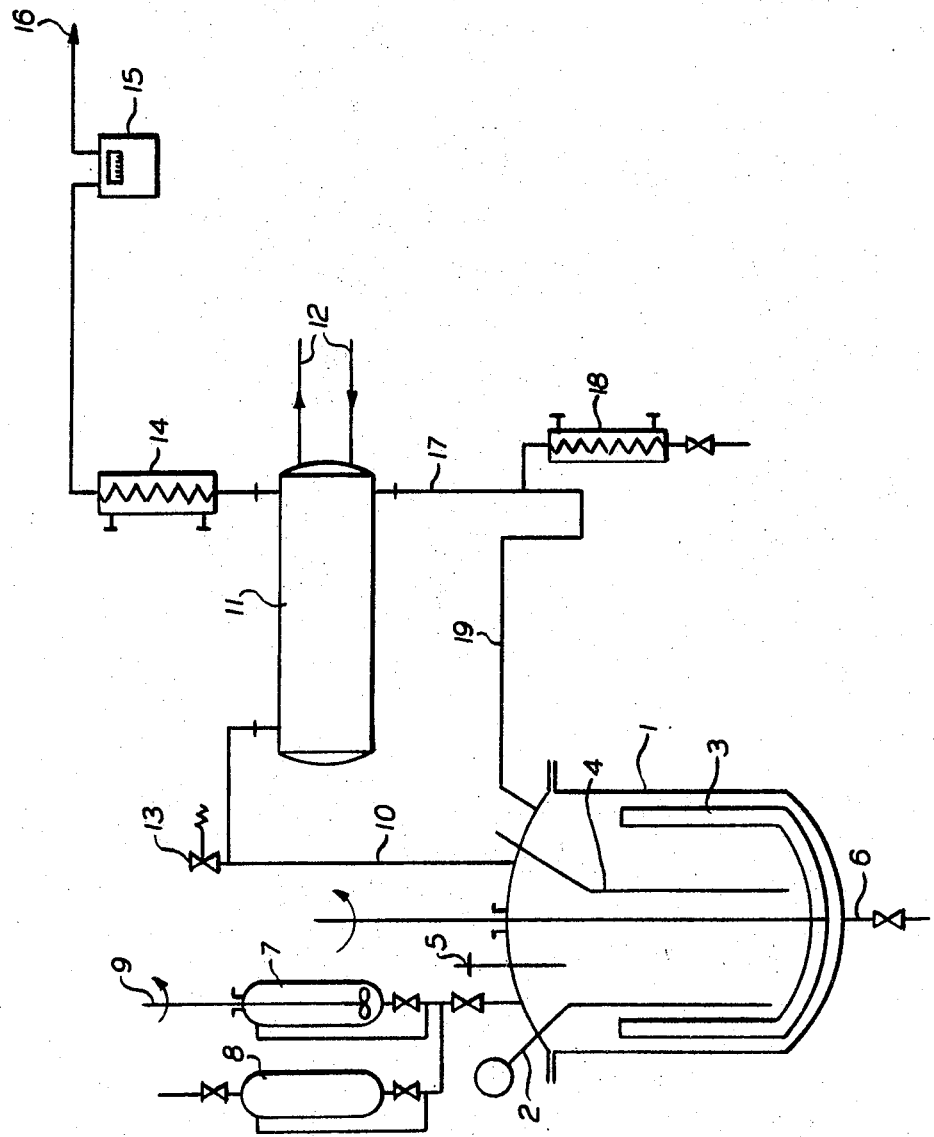

METHOD OF PREPARING ORTHOSILICIC ACID TETRAALKYL ESTERS

This invention relates to improvements in the process of preparing alkylorthosilicates. More particularly this invention is directed to an improved process of preparing orthosilicic acid tetraalkyl esters by reaction of silicon and/or iron silicide and/or ferrosilicon with the corresponding alcohol in the presence of the corresponding alkali alcoholate.

Alkyl orthosilicates, and particularly orthosilicic acid tetramethyl ester have achieved considerably importance as intermediate products. For example, orthosilicic acid tetramethyl ester is used as a starting material in the preparation of silica characterized by an extremely large surface area. Other orthosilicic acid tetraalkyl esters and particularly orthosilicic acid tetraethyl ester, are of special technical interest for use in the binding of metal casting sands.

In view of this importance of the orthosilicic acid tetraalkyl esters, direct, simple and convenient method of preparation thereof is desirable.

Orthosilicic acid esters can be prepared, as is known, by the reaction of silicon halides with the corresponding alcohols. In this reaction, the corresponding hydrogen halide is formed as a byproduct, which giving rise to a whole series of secondary reactions and ultimately results in the considerable production of byproducts. For example, in such side reactions, water, organic halogen compounds, and in particular polymeric silicic acid esters are formed. The yields of the desired orthosilicic acid esters in such processes are accordingly rather small, and, because of the production of the hydrogen halide, the material from which the reaction apparatus is constructed must meet stringent requirements.

According to another known process, alkyl orthosilicates can be prepared from silicon and the particular alcohol involved if the silicon is pretreated with copper. As the silicon which has been pretreated with copper reacts only very sluggishly, only small yields of ester are recovered, amounting, for instance, to not more than 50 percent in the case of the synthesis of orthosilicic acid tetramethyl ester. Further, high temperatures generally are required to be used in this latter process.

According to still another known process, silicic acid esters, particularly those of ethanol and higher alcohols, can be prepared directly from silicon and the corresponding alcohols if the reactants are reacted at elevated temperature, under the action of an alkaline catalyst dissolved in the reaction mixture, and preferably under elevated pressure. The silicon must, however, be at the same time subjected to friction grinding, so that the surface thereof is constantly reexposed. Examples of suitable catalysts for use in this process are members of the group of sodium ethylate, potassium hydroxide, ammonium bifluoride, ammonia and dicyandiamide. According to this known process, catalysts are used in a concentration of 5 to 15 percent of the weight of the alcohol. This latter process has, however, a number of disadvantages. The use of caustic potash as a catalyst results in a diminution of the yield due to the formation of silicates. Dicyandiamide is only 10 percent soluble in the reaction alcohol and consequently is not active enough as a catalyst. Of the substances named, ammonia is the most suitable catalyst. Its use, however, entails the great disadvantage that the reaction must be carried out in sealed vessels and under pressure. When sodium ethylate is used as the catalyst in this process of the prior art, the reaction speed and the yield are also low and unsatisfactory.

In accordance with the invention, it has now been found that orthosilicic acid tetraalkyl esters can be easily, simply and economically prepared by conducting the reaction of silicon, iron silicide, ferrosilicon or mixtures thereof with the desired alcohol in the presence of the corresponding alkali alcoholate, in the presence of 70 to 99 percent by weight, with reference to the entire amount of liquid in the reaction vessel, and preferably of about 80 to 90 percent by weight of the orthosilicic acid tetraalkyl ester, and by continuously adding the alcohol during the reaction.

The liquid mixture in the reactor, according to the invention, consists of at least 70 percent end product by weight and the balance, making up the total of 100 percent, of the starting alcohol. Furthermore, at least 33 percent of the weight of the total mixture, solid and liquid, in the reactor consists of silicon, iron silicide, ferrosilicon or mixtures thereof, and the reactor also contains sufficient alkali alcoholate, preferably amounting to from 2 to 5 percent of the weight of the entire liquid content.

The grain size of the silicon and of the substances containing silicon in accordance with the invention must not be greater than 100 microns. The maximum content of silicon or silicon-containing substances is limited only by the consideration that the reaction mixture must be fluid enough to permit thorough stirring.

Preferred alkali alcoholates for this invention are sodium alcoholates and potassium alcoholates.

Under the reaction conditions according to the invention, small amounts of alkali alcoholate will always dissolve in the liquid mixture, depending on the alcohol concentration. As is known, these catalysts are easily soluble in alcohols, but practically insoluble in silicic acid esters. As a result, the alkali alcoholate may also be present in solid form, for instance, powder form in the reaction mixture of the silicic acid ester and alkali alcoholate are to be present in larger quantities. Under the conditions according to the invention, the concentration of the alkali alcoholate with reference to the alcohol is always optimum. When alcohol is added, the reaction takes place spontaneously.

The speed of the reaction depends on the amount of alcohol that is added, and therefore it can be precisely controlled by regulating the rate at which the reaction alcohol is metered into the mixture. The speed of reaction, however, also depends on the amount of alkali alcoholate that is dissolved in the reaction mixture, and is limited by the maximum solubility of the same.

When the feeding in of the alcohol is interrupted, the remainder of the alcohol in the reactor is quickly used up and the reaction stops.

The reaction is generally carried out at atmospheric pressure and at the boiling temperature of the reaction mixture. Because of the concentrations used, the boiling temperature is higher than in the prior-art process in which silicon is made to react directly with the alcohol. Basically, operation under elevated pressure is also possible but is not necessary.

The formation of the esters takes place very rapidly in the process of the invention, but a violent reaction is not involved. Foaming over or boiling over, due for instance to delayed boiling or to delayed reaction, cannot take place, as no great amount of alcohol is present. If the alcohol feed is maintained sufficient, the rate of ester formation can surprisingly be doubled over that of the prior-art process.

The process can be carried out either continuously or in batches. However, it is particularly well adapted to a continuous procedure. In the latter case, the process of the invention can advantageously be improved by also continuously adding the silicon, iron silicide, ferrosilicon or mixtures thereof during the reaction, according to the rate at which it is progressing. The silicon powder or the powdery silicon-containing material added to the mixture must be of precisely the same degree of fineness as the powder contained in the reactor.

Three alternate methods for feeding in the alcohol and silicon and the silicon-containing materials during the reaction according to the invention which have proved to be particularly suitable are the following:

1. The alcohol and the silicon or silicon-containing material are added together in the form of a suspension.

2. The alcohol and the silicon or silicon-containing material are introduced separately, the silicon or silicon-containing material preferably being used in powder form.

3. The alcohol and silicon or silicon-containing material are added separately, the silicon or silicon-containing material being in the form of a suspension in the orthosilicic acid tetraalkyl ester involved. In the latter case, it would be advantageous to carry the desired reaction product in an auxiliary circuit.

The process of the invention can be applied advantageously to the synthesis of esters of silicic acid with aliphatic alcohols containing 1 to 4 carbon atoms.

The process of the invention is of particular importance for the preparation of orthosilicic acid tetramethyl ester. In this case, methanol is used as the reaction alcohol, and an alkali methylate, preferably sodium methylate, is used as the catalyst for the formation of the ester. The advance achieved by the invention is to be considered entirely unexpected because of the kinetic laws of the reaction and the mass effect law. Thus if a reaction mixture contains the reacting substances in a low concentration and the end product in a high concentration, these laws would lead one to expect a slow reaction. The more rapid formation of ester under the conditions pursuant to the invention is therefore to be considered quite surprising.

The process according to the invention is characterized by a great number of advantages over conventional silicic ester syntheses and particularly over the known prior-art process for the direct preparation of such esters from silicon and alcohols.

One great advantage is the already mentioned increase in the speed of the reaction. It is also to be stressed that, all in all, very small amounts of catalyst (alkali alcoholate) are required for the process. Thus whereas in the prior-art method which proceeds directly from silicon and alcohols, large quantities of alcoholic solutions containing high percentages of alcoholate have to be added, in the process according to the invention from 2 to 5 weight-percent; with reference to the total liquid will suffice. This offers the advantage on the one hand that the material costs are lowered, and on the other hand, that, due to the slight concentration of the alcoholate in the total liquid, which is entirely sufficient for the advantageous reaction velocity, there is no danger of clogging of pipes and fittings due to segregation of catalyst.

A special feature of the process of the invention is the very high-reaction temperatures used. The reaction temperature is determined by the high concentration, amounting to more than 70 percent of the weight of the total liquid, of the silicic acid ester that is the end product. It is known that esters have much higher boiling points than the corresponding alcohols. High-ester concentrations, i.e., usually containing over 85 to 90 percent ester, can be produced by the process according to the invention.

The total costs of the preparation of the products of the process according to the invention are much more economical than encountered in connection with any of the known processes.

A considerable economic advantage of the process of the invention is that, once the reaction has been initiated, no further heat input is required. The heat developed by the reaction suffices to sustain the reaction and to continuously distill over the end product. In the processes known hitherto, a continuous input of heat was necessary in as much as large amounts of alcohol passed over in the distillation.

The reaction can be regulated very precisely by the procedure of the invention. If the alcohol feed is stopped, the reaction then instantly comes to a halt. On the other hand, the reaction immediately starts up again as soon as feeding of the alcohol is resumed. The easy control of the reaction thereby made possible is particularly important from the viewpoint of safety from accidents. In the known process, the direct reaction of the silicon with the alcohol did not permit such an abrupt stopping of the reaction, because all of the reaction components were present in large amounts in the reaction mixture, and even after the heat input had been stopped and the feed lines had been shut off, the reaction components continued to react for a rather long time before the consumption of the alcohol in the reactor or the temperature drop brought the reaction to a halt. If any trouble occurs in the installation, such as pipe breakage or a leak in the fittings, there is consequently a danger, in this prior-art process, of the emission of large amounts of toxic substances and of hydrogen gas. Accidents due to poisoning and explosion must therefore be taken into account. Such dangers are largely excluded by the process according to the invention.

In the drawing which forms a part of this disclosure, there is described an example of an installation such as can be used for carrying out the process of the invention. The reaction mixture is in the reactor 1, which is provided with a temperature measuring system 2, a stirrer 3, a baffle 4, a filler tube 5 and a discharge tube 6. Above the reactor 1, there are located two vessels 7 and 8, one of which (7) is provided with a stirrer 9. A suspension of silicon in alcohol, for example, can be fed from vessel 7 into the reactor through an appropriate vertical pipe. Vessel 8 serves for stirring and/or feeding alcohol through a pipeline into reactor 1. During the process the vapors of the reaction mixture are fed through vapor pipe 10 to the condenser 11, where they are condensed. The condenser is cooled by water entering and leaving through pipes 12. For reasons of safety, the condenser is preceded by a pressure safety valve 13. The exhaust gas (hydrogen) is discharged through the condenser 14, a gas meter 15 and the exhaust pipe 16. The condensate passes from condenser 11 through pipe line 17. A portion of this condensate can be taken off through condenser 18, while the rest is fed back to the reactor through line 19.

The apparatus represented in the drawing is only one example of an installation that is suitable for use in carrying out the process according to the invention. Any modifications can be made thereto which suggest themselves to the man versed in the art as advantageous in connection with the carrying out of the process.

The following examples are given in order to further illustrate the invention and are in no wise to be construed as a limitation of the scope thereof.

EXAMPLE 1

The reaction was carried out in an installation of the type that has been represented in the drawing and described above. The one-liter glass vessel provided with a stirrer, a thermally insulated fractionating column 10, a feed inlet 5 and an apparatus for measuring the temperature in the liquid 2 (thermocouple), was charged with 500 g. of silicic acid tetramethyl ester, 250 g. of powdered technical silicon (grain size 10 $\mu$, Si content 98 percent by weight) and 12.5 g. of sodium methylate powder. This mixture was heated with stirring to the boiling temperature (121° C).

In the second vessel 7, a suspension of technical silicon of the above quality in methanol was prepared. The weight ratios in this suspension corresponded to the molar ratios of the equation for the reaction by which the ester is formed. It amounted, therefore, to 28 g. of silicon to 128 g. of methanol. 1.6 kg. of this silicon-methanol mixture were then introduced into the reaction vessel every hour. Release of hydrogen amounting to about 450 l/hr commenced, and an equilibrium temperature of 100° C. established itself. About 1.62 kg. of the condensate were drawn off hourly. The reaction could be conducted continuously in this manner, without the need for any input of heat.

The condensate taken off from the condenser 18 consisted of 86 percent $Si(OCH_3)_4$ and about 14 percent methanol. The latter was fed back into the process. The yield amounted to 98 percent with reference to the methanol, and the yield per unit of volume per unit of time amounted to about 1,550 g./l hr. After the addition of the silicon-methanol suspension was discontinued, the temperature of the liquid in the reaction vessel rose within a few minutes to 121° C., and the evolution of hydrogen stopped.

EXAMPLE 2

The same procedure was followed as has been set out in example 1, with the exception that sodium ethylate was used instead of the sodium methylate, and ethanol and ethyl ester were charged into the reaction vessel instead of methanol and methyl ester; accordingly a silicon-ethanol suspension in a molar ratio of 1:4 was metered into the vessel. The quantity of suspension added per hour amounted to 146 g.

Prior to the continuous feeding of the suspension, the reaction mixture was heated to a temperature of 165° C. After the feeding of the silicon-ethanol mixture had started, the release of hydrogen began and the temperature fell to 130° C. In order to keep the alcohol concentration and the liquid level constant in the reactor, a 160 g. of condensate was withdrawn per hour.

The analysis of the condensate showed 87 percent $Si(OC_2H_5)_4$, which corresponds to a yield of 98 percent with reference to the ethanol. The thanol recovered from the condensate was continuously fed back into the process, being used in the preparation of the silicon-ethanol mixture which was then metered into the reaction. The yield amounted to 144 grams. per liter per hour. After the feeding in of the silicon-ethanol suspension was stopped, there was no further evolution of hydrogen, and within a few minutes the temperature in the reaction vessel returned to 165° C.

EXAMPLE 3

In the same reaction vessel as has been described in example 1, 500 g. of silicic acid tetra-n-propyl ester, 250 g. of technical silicon of the same quality as in example 1, and 25 g. of sodium-n-propylate powder were introduced.

This suspension was heated with stirring to the boiling temperature (225° C). A mixture of silicon and n-propanol in a molar ratio of 1:4 was then metered in. The rate of flow was adjusted to 12.5 g./hr. in order to achieve the maximum rate of reaction. The reaction took place with the liberation of 2 liters per hour of hydrogen. 13 g. of the condensate were drawn off per hour.

Analysis of the condensate showed a content 92 percent $Si(OC_3H_7)_4$. The yield amounted to 12 g./l/hr.

EXAMPLE 4

In the same agitator-equipped vessel as used in examples 1 to 3, a suspension was prepared from 500 g. of silicic acid tetra-m-butyl ester, 250 g. of silicon metal powder (10 $\mu$, 98 weight-percent Si) and 25 g. of sodium n-butylate powder.

This suspension was heated to the boiling temperature (270° C) with stirring, and a mixture of n-butanol and technical silicon in a molar ratio of 4:1 then metered in as set out in the above examples, in such a manner that the addition corresponded to the release of hydrogen.

16.3 g. of the butanol-silicon mixture was fed in per hour, while hydrogen was released at the rate of 2.2 l/hr. and the reaction temperature adjusted itself to 180° C.

The amount of condensate withdrawn per hour was 16.8 g.

Analysis of the condensate: 95.3 weight-percent $Si(C_4H_9O)_4$, corresponding to a yield of 16 g./l/hr.

EXAMPLE 5

The same procedure was followed as has been set out in example 1, with the exception that 16 g. potassium methylate were used instead of 12.5 g. sodium methylate. The reaction was analogous to the reaction disclosed in example 1. The yield amounted to 98 percent, and the yield per unit of volume per unit of time amounted to about 1,550 g./l/hr.

We claim:

1. Process for preparing orthosilicic acid tetraalkyl esters which comprises reacting at least one member selected from the group consisting of silicon, iron silicide, and ferrosilicon with an alcohol corresponding to the ester to be prepared in the presence of the corresponding alkali alcoholate, conducting said reaction in the presence of 70 to 99 percent by weight referred to the total liquid present in said reaction of said orthosilicic acid ester and continuously introducing said alcohol during said reaction.

2. Process according to claim 1 which comprises conducting said reaction in the presence of 80 to 90 weight-percent of said orthosilicic acid tetraalkyl ester.

3. Process according to claim 1 which comprises introducing said silicon, iron silicide and ferrosilicon group member continuously into said reaction in the quantity in which it is used up per unit of time in said reaction.

4. Process according to claim 1 which comprises utilizing said alkali alcoholate in an amount of from 1 to 10 weight-percent referred to the total liquid present in said reaction.

5. Process according to claim 1 which comprises utilizing said alkali alcoholate in an amount of from 2 to 5 weight-percent referred to the total liquid present in said reaction.

6. Process according to claim 3 which comprises introducing said alcohol and said silicon, iron silicide and ferrosilicon group member in the form of a suspension thereof.

7. Process according to claim 3 which comprises introducing said silicon, iron silicide and ferrosilicon group member in the form of a fine powder.

8. Process according to claim 3 which comprises introducing said silicon, iron silicide and ferrosilicon group member in the form of its suspension in said orthosilicic acid tetraalkyl ester.

9. Process according to claim 1 wherein said alcohol contains one to four carbon atoms.

10. Process according to claim 1 wherein said alcohol is methanol and said alkali alcoholate is alkali methylate.

11. Process according to claim 1 wherein said alcohol is ethanol and said alkali alcoholate is alkali ethylate.

12. Process according to claim 1 wherein said alcohol is n-propanol and said alkali alcoholate is alkali n-propylate.

13. Process according to claim 1 wherein said alcohol is butanol and said alkali alcoholate is alkali n-butylate.

* * * * *

UNITED STATES PATENT OFFICE
CERTIFICATE OF CORRECTION

Patent No. 3,627,807      Dated Dec. 14, 1971

Inventor(s) Otto Bleh, et al.

It is certified that error appears in the above-identified patent and that said Letters Patent are hereby corrected as shown below:

Col. 5, line 13 change "$Si(OC_2H_5b4$" to --$Si(OC_2H_5)_4$--;

line 37, change "$Si(OC_3H_7b4$" to --$Si(OC_3H_7)_4$--.

Signed and sealed this 16th day of May 1972.

(SEAL)
Attest:

EDWARD M. FLETCHER, JR.
Attesting Officer

ROBERT GOTTSCHALK
Commissioner of Patents